Jan. 4, 1927.

E. C. LITCHFIELD ET AL 1,613,178

VARIABLE CAM FOR FERTILIZER DISTRIBUTORS AND THE LIKE

Original Filed May 31, 1924

INVENTORS:
E. C. Litchfield,
Victor Speer and C. C. Hermann,
BY Wm. F. Freudenreich,
ATTORNEYS.

Patented Jan. 4, 1927.

1,613,178

UNITED STATES PATENT OFFICE.

EDGAR C. LITCHFIELD AND VICTOR SPEER, OF CEDAR FALLS, IOWA, AND CLARENCE C. HERMANN, OF MOLINE, ILLINOIS, ASSIGNORS TO HENRY L. LITCHFIELD, OF WATERLOO, IOWA, AND EDGAR C. LITCHFIELD, OF CEDAR FALLS, IOWA.

VARIABLE CAM FOR FERTILIZER DISTRIBUTORS AND THE LIKE.

Original application filed May 31, 1924, Serial No. 716,912. Divided and this application filed December 10, 1925. Serial No. 74,658.

A common type of manure spreader is one in which the contents rest upon an endless apron in the bottom of the spreader body, the apron being slowly fed, step by step to carry the contents to the discharge point at the rear. The feeding of the apron is effected by a pawl and ratchet mechanism, the pawl being actuated by a cam on one of the rear axles of the spreader. By providing a spreader of this type with a few simple attachments it can be adapted to distribute limerock or other mineral fertilizers. However, the minimum rate of feed of the contents toward the rear, which is produced by the operating mechanism for the apron of the manure spreader, is too rapid when distributing some kinds of mineral fertilizers under certain conditions.

The object of the present invention is to produce a simple and novel device which may easily be applied to the feeding mechanism for the apron of a manure spreader and secure a considerable addition to the range of feed.

The actuating cam in the spreader to which our invention relates is one having a plurality of points, regularly spaced along an angular distance of 360 degrees. In accordance with the present invention, a plurality of filling blocks, easily applied or removed, are provided for attachment to the cam so as to permit the user to fill one or more of the valleys in the cam and thus reduce the number of effective high points. Therefore, considered in one of its aspects, the present invention may be said to have for its object to produce a simple and novel attachment for a multiple-point cam to vary the number of effective high points on the cam.

The present invention is disclosed in our prior application Serial No. 716,912, filed May 31, 1924, of which the present application is a division.

Figure 1:
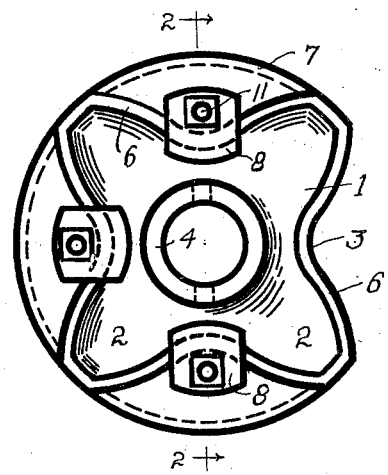
Figure 2:
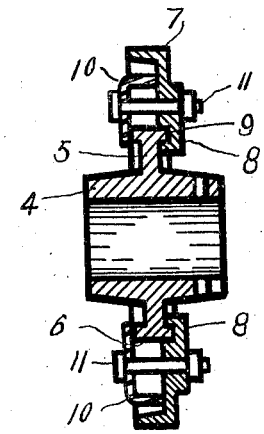
Figure 3:
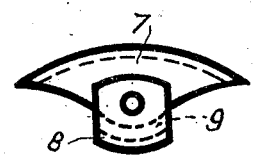
Figure 4:
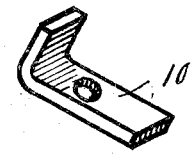

The various features of novelty whereby our invention is characterized will hereinafter be pointed out with particularity in the claims; but, for a full understanding of our invention and of its objects and advantages, reference may be had to the following detailed description taken in connection with the accompanying drawing, wherein:

Figure 1 is a side elevation of the actuating cam for the apron of a fertilizer distributor, having applied thereto a plurality of the improved filler blocks; Fig. 2 is a section taken approximately on line 2, 2 of Fig. 1; Fig. 3 is a side view of one of the blocks detached from the cam; and Fig. 4 is a perspective view of one of the clamping plates by means of which the blocks are fastened to the cam.

Referring to the drawing, 1 represents a cam adapted to be fastened to a suitable shaft or axle, the cam being shown as having four projections 2, spaced 90 degrees apart from each other so as to form four high points and four valleys as indicated at 3. The cam conveniently consists of a hub 4 surrounded by a web 5 that has a widened rib or flange 6 following the periphery thereof. The attachments for the cam consist of a plurality of blocks 7 each adapted to be set in one of the valleys and having an outer face such that if blocks are set in all of the valleys the cam will be transformed into a device having a circular periphery. Each block has a lug 8 projecting downwardly from one side at about the middle; the lug being provided on what may be termed the inner side with a groove 9 to receive one edge of the flange 6 that extends around the cam, when the block is set in one of the valleys. In order to hold the block in place, an L-shaped clamping plate 10 is placed against the block and the cam on the opposite side of the cam from that on which the lug 8 lies; and a bolt 11 is passed through the clamping plate and the web portion of the block so as to clamp the flange or rim of the cam between the lug on the block and the clamping plate.

If the lifting action of the cam is to be reduced by one-fourth, namely if the lever or pawl to be operated by the cam is to be raised only three times during each revolution of the cam, a single block is attached to the cam. If the action is to be slowed down still more, a second block may be added. Similarly, the addition of a third block will transform the cam into one having only a single high point and a single valley.

The attachments are cheap and simple and can be easily applied to the cam and again removed therefrom, so that the owner of a manure spreader employing an actuating cam of the type illustrated, can reduce the minimum rate of feed of the fertilizer toward the discharge point by one-fourth, one-half, or three-fourths, with very little effort and at a very small expense.

While we have illustrated and described with particularity only a single preferred form of our invention, we do not desire to be limited to the exact structural details thus illustrated and described; but intend to cover all forms and arrangements which come within the definitions of our invention constituting the appended claims.

We claim:—

1. The combination with the multiple-point apron-actuating cam of a fertilizer distributor having a peripheral cam face composed of projections alternating with valleys of filler blocks adapted to be detachably secured in the valleys of the cam to vary the contour of the same.

2. The combination with a cam having a peripheral cam face comprising projections alternating with valleys, of a filler block adapted to be detachably secured to the cam in one of the valleys.

3. The combination with a cam having a peripheral cam face comprising projections alternating with valleys, the projections being uniformly spaced about a central point, and filler blocks each adapted to be detachably secured in one of the valleys.

4. The combination with a cam having a peripheral cam face comprising projections alternating with valleys, the projections being uniformly spaced about a central point, and filler blocks each adapted to be detachably secured in one of the valleys, the filler blocks having peripheries that are arcs of a circle whose center is the said central point.

5. The combination with a cam having peripheral projections and valleys, a filler block adapted to be seated in one of the valleys, a lug on the block adapted to bear against a side of the cam, a clamping plate adapted to engage with the opposite side of the cam and with said block, and a bolt adapted to pass through said plate and the block.

In testimony whereof, we sign this specification.

EDGAR C. LITCHFIELD.
VICTOR SPEER.
CLARENCE C. HERMANN.